United States Patent [19]
Hofmann

[11] 4,393,302
[45] Jul. 12, 1983

[54] APPARATUS AND METHOD FOR READING PUNCHED CARDS

[75] Inventor: Rolf L. Hofmann, Basel, Switzerland

[73] Assignee: Advanced Card Systems, Ltd., Basil, Switzerland

[21] Appl. No.: 336,599

[22] Filed: Jan. 4, 1982

[51] Int. Cl.³ .......................................... G06K 7/016
[52] U.S. Cl. .................................. 235/474; 235/442
[58] Field of Search ............................... 235/442, 474

[56]  References Cited
U.S. PATENT DOCUMENTS
3,601,584  8/1971  Kashio ............................... 235/474

Primary Examiner—Harold I. Pitts
Attorney, Agent, or Firm—Merchant, Gould, Smith, Edell, Welter & Schmidt

[57] ABSTRACT

The present invention relates to an apparatus and a method for reading punched cards and, more particularly, to such apparatus, and method for reading gravity-fed punched cards.

This apparatus comprises a reference perforation sensor located upstream of the hole sensors so as to sense the duration of the passage of a reference perofaration cut out in a card, before any hole position faces the set of hole sensors.

13 Claims, 2 Drawing Figures

APPARATUS AND METHOD FOR READING PUNCHED CARDS

BACKGROUND OF THE INVENTION

The present invention relates to an apparatus and a method for reading punched cards and, more particularly, to such apparatus, and method for reading gravity-fed punched cards.

Conventionally, a punched card comprises hole or perforation positions arranged in rows and columns. One widely used type of card shows 12 rows and 80 columns of hole positions.

Conventional punched card readers comprise a reading station and a drive mechanism for feeding the cards to the reading station. A common drive mechanism is made of a pair of punch rollers, at least one of which is positively driven. A card put into the reader is punched by the rollers and fed to the reading station at a controlled linear speed. A techometer coupled to the rotation of one of the rollers provides signals representative of the column positions while signals representative of the row positions are derived from the reading station itself.

While such a card reader is fully operative, the drive mechanism and associated card metering means add to its manufacturing and maintenance costs.

Another type of punched card reader has been devised to eliminate the above cost problems. Punch cards used with such a reader comprise clock marks representative of the column positions, for example. A row of such clock marks may be printed along an edge of the card, to be read by a mark sensor generating signals representative of the column positions while the card is driven through the reading station. An obvious drawback of this solution lies in that satisfactory operation of the reader depends on correct reflectivity and registration of the printed clock marks.

SUMMARY OF THE INVENTION

It is a primary object of the present invention to provide a punched card reader adapted to be fed with free-falling cards, so as to get rid of the problems tied to the use of the card driving mechanisms forming part of the prior art card readers.

Another object of the present invention is to provide such a card reader which does not show the above mentioned drawback of the prior art readers fed with punched cards having printed clock marks.

It is still another object of the present invention to provide a gravity-fed punched card reader adopted to compensate for certain variations of the hole sizes of the punched cards with which the reader is fed, or variations in the gravity-feeding of the cards.

These and other objects of the invention are achieved with an apparatus for reading cards having holes arranged in r rows and c columns, comprising:

(a) means for gravity feeding a card along a path parallel to the rows of hole positions;

(b) a reading station having a set of r hole sensors aligned transversely to the feed path so that each sensor is associated with one of the r rows;

(c) a card presence sensor adapted to sense the presence of a card in the reading station;

(d) first means for measuring the period of time $\Delta t_o$ elapsed from the passage of the leading edge of a card in front of the card sensor to the passage of a particular hole of the card;

(e) second means for measuring the duration $\Delta t_n$ of the passage of that hole in front of the associated hole sensor, and (f) means for computing ratio $\Delta t_o/\Delta t_n$ so as to derive from that ratio of the column position of the sensed hole.

BRIEF DESCRIPTION OF THE DRAWING

These and other objects, advantages and features of the invention will become more apparent from reading through the following description of the embodiments of the invention, with reference to the accompanying drawing wherein.

DETAILED DESCRIPTION OF THE INVENTION

Figure 1:
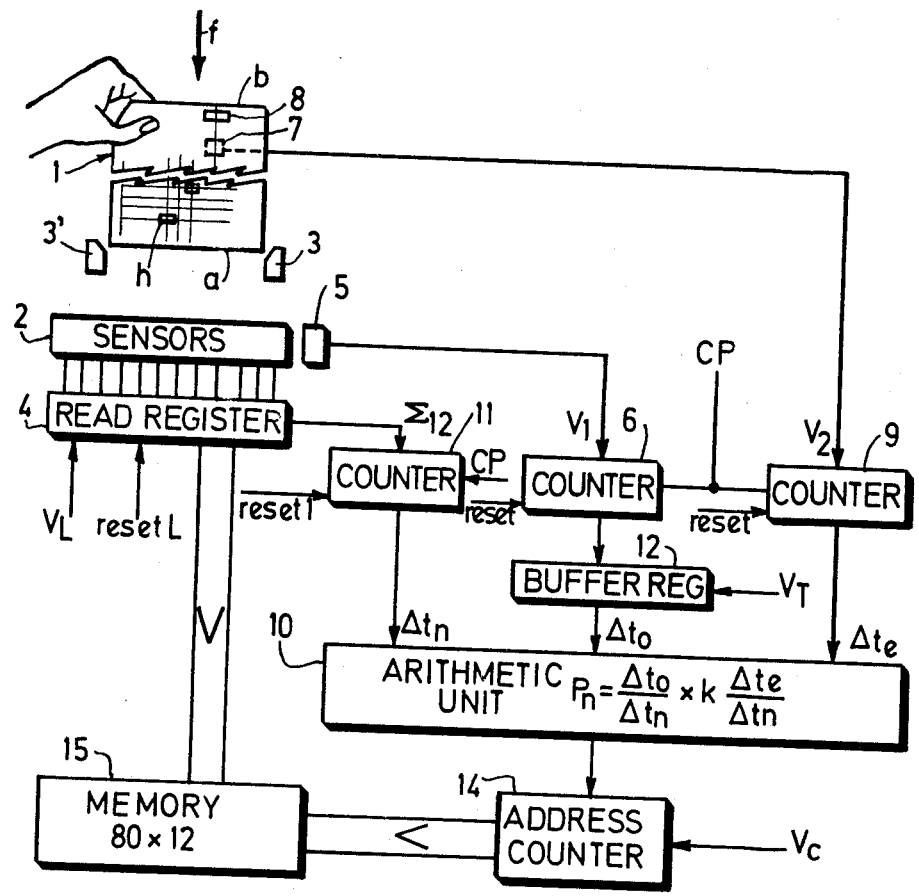
FIG. 1 is a schematic diagram in block form of a gravity fed punched card reader according to a preferred embodiment of the invention.

Referring to FIG. 1, there is shown an apparatus for reading an aperture card 1 which is manually inserted through a slot (not shown) of the housing of the apparatus, so as to fall freely, in the direction of arrow f, in front of a set 2 of photosensors. Conventional punched cards comprise 12 rows and 80 columns of hole positions. Therefore set 2 comprises 12 photosensors such as, for example, infra-red photo-diodes each one being associated with a source of infra-red radiation, a beam of which is oriented to the photosensitive surface of the photodiode. Guide means 3, 3' are used to align each row of hole positions of a falling card with an associated photosensor. When a hole h is aligned with the photosensor associated to the row comprising this hole, the photosensor is hit by the infra-red beam passing through the hole, thus generating a signal provided to a read-register 4. The read-register may comprise, for example, 12 RS triggers.

A card presence sensor 5 is positioned at the level of the set 2 photodiodes. It provides an "enable" signal $V_1$ as long as it faces a card, to a counter 6 fed by clock pulses CP supplied by an electronic clock (not shown).

A reference perforation sensor 7 is located upstream of the set 2 of photodiodes so as to be aligned with a reference perforation 8 cut out in a card falling down into the apparatus according to the present invention. The purpose of this additional perforation will be explained later in detail. Sensor 7 provides an enable signal $V_2$ to a counter 9 fed with clock pules CP which are counted from the time at which the leading edge of perforation 8 faces sensor 7 up to the time at which the trailing edge of that perforation falls downstream of sensor 8, then providing a count $\Delta t_e$ to an arithmetic unit 10.

Sensor 7 is positioned upstream of set 2 so as to sense perforation 8 before any hole position of the card faces the set of photodiodes. Therefore the distance of sensor 7 to set 2 is commensurate with the length of card 1, parallel to arrow f.

Read-register 4 supplies another counter 11 with a signal $\Sigma_{12}$ which is the logic sum of the outputs of the 12 photodiodes of set 2. Therefore, counter 11 is activated every time a hole, in any one of the 12 rows of the card, faces the photodiode associated with that row. Counter 11 thus provides a count $\Delta t_n$ which is representative of the period of time separating the passages of the leading edge and trailing edge respectively, of a hole located in a particular column. The position of that column will be referred to as Pn in the following description. As gravity accelerates the card while it drops, it is clear that count $\Delta t_n$ will vary with the position of the column comprising the sensed hole.

According to the present invention, position $P_n$ is obtained by correlating count $\Delta t_n$ with another count $\Delta t_o$ representative of the period of time separating the passage of leading edge a of the card in front of sensor 5 and the passage of the sensed hole. Thus, $\Delta t_o$ is representative of the vertical distance between leading edge a of the card and the vertical position of the sensed hole. $\Delta t_n$ is related to the speed of the card at the time that hole is sensed. In fact, the vertical width of the hole is small and therefore the card speed may be considered as constant during the period of time $\Delta t_n$.

Figure 2:
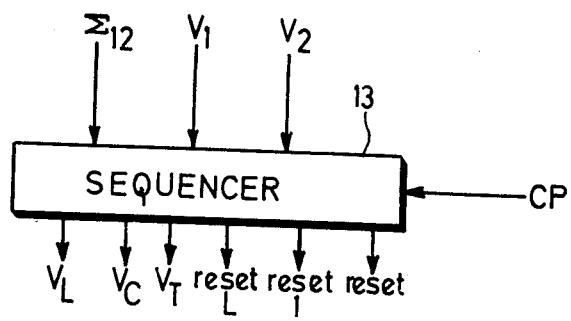
FIG. 2 is a diagram of the inputs and outputs of a sequencer used to control the card reader shown in FIG. 1.

To get a count representative of $\Delta t_o$, the count reached by counter 6 is transferred into a buffer register 6 under the control of an enable signal $V_T$ provided by the sequence shown schematically in FIG. 2. Sequencer 13 controls the whole operation of the apparatus according to the invention, by providing properly timed signals to various components of the apparatus, as will be set out herein-below in detail. The same clock provides synchronised clock pulses to sequencer 12 and to counters 6, 9 and 11. In a preferred embodiment of the invention a clock frequency of 83 kHz is used.

Sequencer 13 is fed by signals $\Sigma_{12}$ and $V_1$. When signal $\Sigma_{12}$ disappears, sequencer 13 supplies buffer register 12 with signal $V_T$ to transfer the instant count of counter 6 into register 12, without interrupting the counting in counter 6.

Therefore, buffer register 12 supplies the arithmetic unit 10 with counts $\Delta t_o$, each count being representative of the distance between leading edge a of the card and a particular sensed hole. Arithmetic unit 10 computes ratio $\Delta t_o/\Delta t_n$ which is related to column position $P_n$ of the sensed hole.

According to another aspect of the invention, it is possible to take into account certain parameters influencing the operation of the above disclosed card reader, by computing a factor for correcting ratio $\Delta t_o/\Delta t_n$ from these influences. Several accidental effects (friction, the manner in which the operator releases the card, etc . . . ) may shift the real fall of a card from the theorethical free-fall. There also exist various standards as concerns the width of the holes.

Count $\Delta t_e$, provided by counter 9 under the control of sensor 7 associated to reference perforation 8, is used to take into account the above mentioned effects. Therefore arithmetic unit 10 computes the position $P_n$ of a sensed hole according to the formula:

$$P_n = (\Delta t_o/\Delta t_n) \times K(\Delta t_e/\Delta t_n)$$

K being a factor related to the ratio of the width of the reference perforation to the hole width of the card according to a particular standard.

An address counter 14 is connected to arithmetic unit 10. It is controlled by an enable signal $V_c$ provided by the sequencer 13 to accept the column address only when $V_c$ is supplied by sequencer 13, so as to avoid a mixing of the signals generated by the successive columns, during the reading of the card.

Finally a memory 15 is fed by both the read-register 4 and by the column address counter 14 to keep records of the row and columns ranks of each hole punched in the card.

As mentioned above, the whole operation of the apparatus according to the invention is controlled by sequencer 13 shown in FIG. 2. As shown, it is fed by signals $\Sigma_{12}$, $V_1$, $V_2$ and it provides timed enable signals $V_L$, $V_e$, $V_T$ to read register 4, address counter 14 and buffer register 12, respectively. It also provides timed reset signals to read register 4 and to counters 6, 9 and 11. The truth table of that sequencer reads as follows:

|  | $\Sigma_{12}$ | $V_1$ | $V_L$ | $V_c$ | $V_T$ | Reset L | Reset C |
|---|---|---|---|---|---|---|---|
| card input | 0 | 1 | 0 | 0 | 0 | 0 | 1 |
| enable counter 6 | 0 | 1 | 0 | 0 | 0 | 1 | 1 | 0 |
| hole present | 1 | 1 | 0 | 0 | 0 | 0 | 0 |
| transfer counter 6 | 0 | 1 | 0 | 0 | 1 | 0 | 0 |
| hole address | 0 | 1 | 0 | 1 | 1 | 0 | 0 |
| column position | 0 | 1 | 1 | 1 | 0 | 0 | 0 |
| reset counter 11 | 0 | 1 | 0 | 0 | 0 | 0 | 1 | 0 |
| reset register 14 | 0 | 1 | 0 | 0 | 1 | 0 | 0 |
| read end | 0 | 0 | 0 | 0 | 0 | 0 | 0 |

In light of the above disclosure, it is apparent that the present invention provides an efficient and reliable optical punched card reader, simplified in that it comprises no card driving mechanism. The present invention makes it possible to design a portable card reader supplied with batteries only. Such a card reader is useful, for example, to check, on the spot, cards bearing answers to questions put to students.

As will be apparent to those skilled in the art, various changes and modifications may be made to the card reader of the present invention, without departing from the spirit and scope of the invention, as recited in the appended claims.

I claim:

1. A method for reading punched cards having holes arranged in rows and columns, comprising the steps of:
    (a) gravity feeding a card to a reading station, along a path parallel to the rows of perforations of the card,
    (b) measuring the period of time $\Delta t_o$ between the passage of the leading edge of the card and the passage of a particular hole, at a sensing position in the reading station,
    (c) measuring the period of time $\Delta t_n$ between the passages of the leading and trailing edges, respectively, of said hole and,
    (d) computing ratio $\Delta t_o/\Delta t_n$ for determining the position of the column comprising said hole.

2. The method according to claim 1, further comprising the steps of:
    (a) measuring the duration $\Delta t_e$ of the passage, at an associated sensing position in the reading station, of a reference perforation cut out in said card and having a calibrated dimension along the feed path, and
    (b) computing a factor proportional to $\Delta t_e$ for correcting said ratio $\Delta t_o/\Delta t_n$.

3. The method according to claim 2, wherein said correcting factor is in the form $k(\Delta t_e/\Delta t_n)$, where k is a constant depending on the size of the reference perforation with respect to the size of the holes, parallel to the feed path.

4. The method according to any one of claims 1, 2 and 3, further comprising the steps of comparing the durations $\Delta t_n$ for the sensed holes and associating the perforations having same durations as the same column.

5. Method according to any one of claims 1 to 3, further comprising the step of detecting the position of the row comprising a particular hole by means of a sensor associated to said row.

6. Apparatus for reading cards having holes arranged in r rows and c columns, comprising:
 (a) means for gravity feeding a card along a path parallel to the rows of hole positions,
 (b) a reading station having a set of r hole sensors aligned transversely to the feed path so that each sensor is associated with one of the r rows.
 (c) a card presence sensor adapted to sense the presence of a card in the reading station,
 (d) first means for measuring the period of time $\Delta t_o$ elapsed from the passage of the leading edge of a card in front of the card sensor to the passage of a particular hole of the card,
 (e) second means for measuring the duration $\Delta t_n$ of the passage of that hole in front of the associated hole sensor, and
 (f) means for computing ratio $\Delta t_o/\Delta t_n$ so as to derive from that ratio the column position of the sensed hole.

7. Apparatus according to claim 6, wherein said first measuring means comprises a first counter fed by clock pulses and by a signal provided by the card presence sensor, and a buffer register which stores an instant count representative of the $\Delta t_o$ value associated to a sensed hole, each time such a hole is sensed.

8. Apparatus according to claim 7, further comprising a read-register fed by the hole sensors to provide a signal $\Sigma r$ to the second measuring means each time at least one hole is sensed by the hole sensor and to provide signals representative of the row position of the sensed hole.

9. Apparatus according to claim 8, wherein in the second measuring means comprises a second counter fed by signal $\Sigma r$ and by clock pulses synchronised with those provided to the first counter, to supply a count representative of the duration $\Delta t_n$ of the passage of each sensed hole.

10. Apparatus according to claim 9, wherein the computing means comprises an arithmetic unit fed by the buffer register and by the second counter to compute the ratio $\Delta t_o/\Delta t_n$ representative of the column position $P_n$ of a sensed hole.

11. Apparatus according to claim 10, further comprising a reference perforation sensor located upstream of the hole sensors so as to sense the duration $\Delta t_e$ of the passage of a reference perforation cut out in a card, before any hole position faces the set of hole sensors, a third counter fed by the output of the reference perforation sensor and by clock pulses synchronised with those fed to the first and second counters, the count representative of $\Delta t_e$ provided by the third counter being supplied to the arithmetic unit which computes the column position $P_n$ of a sensed hole according to the formula:

$$P_n = (\Delta t_o/\Delta t_n) \times k(\Delta t_e/\Delta t_n)$$

where k is a constant depending on the size of the reference perforation with respect to the size of the holes, parallel to the feed path.

12. Apparatus according to claim 10, further comprising memory means connected to the read-register and to an address counter fed by the arithmetic unit, to store the row and column positions of each sensed hole.

13. Apparatus according to any one of claims 6 to 12, further comprising a sequencer for controlling the apparatus so as to provide timed enable signals and reset signals to said counters and registers.

* * * * *